United States Patent [19]

Verbaan

[11] 4,431,613
[45] Feb. 14, 1984

[54] LEACHING OF SULPHIDIC MATTES CONTAINING NON-FERROUS METALS AND IRON

[75] Inventor: Bernard Verbaan, Randburg, South Africa

[73] Assignee: National Institute for Metallurgy, Transvaal, South Africa

[21] Appl. No.: 433,640

[22] Filed: Oct. 12, 1982

Related U.S. Application Data

[63] Continuation of Ser. No. 235,426, Feb. 17, 1981, abandoned.

[30] Foreign Application Priority Data

Feb. 18, 1980 [ZA] South Africa ............... 80/0904

[51] Int. Cl.³ ............... C01G 55/00; C01G 3/10; C01G 51/10; C01G 53/10
[52] U.S. Cl. ............... 423/22; 423/36; 423/41; 423/109; 423/147; 423/571; 75/101 R; 75/115
[58] Field of Search ............... 423/22, 36, 41, 109, 423/147; 75/101 R, 115

[56] References Cited

U.S. PATENT DOCUMENTS

| | | | |
|---|---|---|---|
| 3,909,248 | 9/1975 | Ryan et al. | 75/101 R |
| 3,962,402 | 6/1976 | Touro | 423/41 |
| 4,094,668 | 6/1978 | Yannopoulas et al. | 75/101 R |
| 4,219,354 | 8/1980 | Rastas et al. | 75/101 R |
| 4,266,972 | 5/1981 | Abad et al. | 423/36 |

*Primary Examiner*—Herbert T. Carter

[57] ABSTRACT

A method of treating sulphidic mattes containing from 5% to 60% iron; from 15% to 40% sulphur together with soluble non-ferrous metals such as copper, cobalt, nickel and zinc and also optionally insoluble non-ferrous metals which term includes platinum group metals gold and silver by a leaching process to effect substantial separation of the non-ferrous metals from iron as well as from insoluble residue material. The matte is contacted in a finely subdivided form with sulphate in acid medium at a temperature of from 70° C. to 120° C. and an oxygen partial pressure of from 50kPa to 1,000kPa. The quantity of sulphate present is at least the stoichiometric amount required for dissolving the soluble non-ferrous metals present but is limited to ensure that a substantial proportion of iron which dissolves simultaneously with the soluble non-ferrous metals precipitates out as it is replaced by dissolving non-ferrous metals.

10 Claims, 1 Drawing Figure

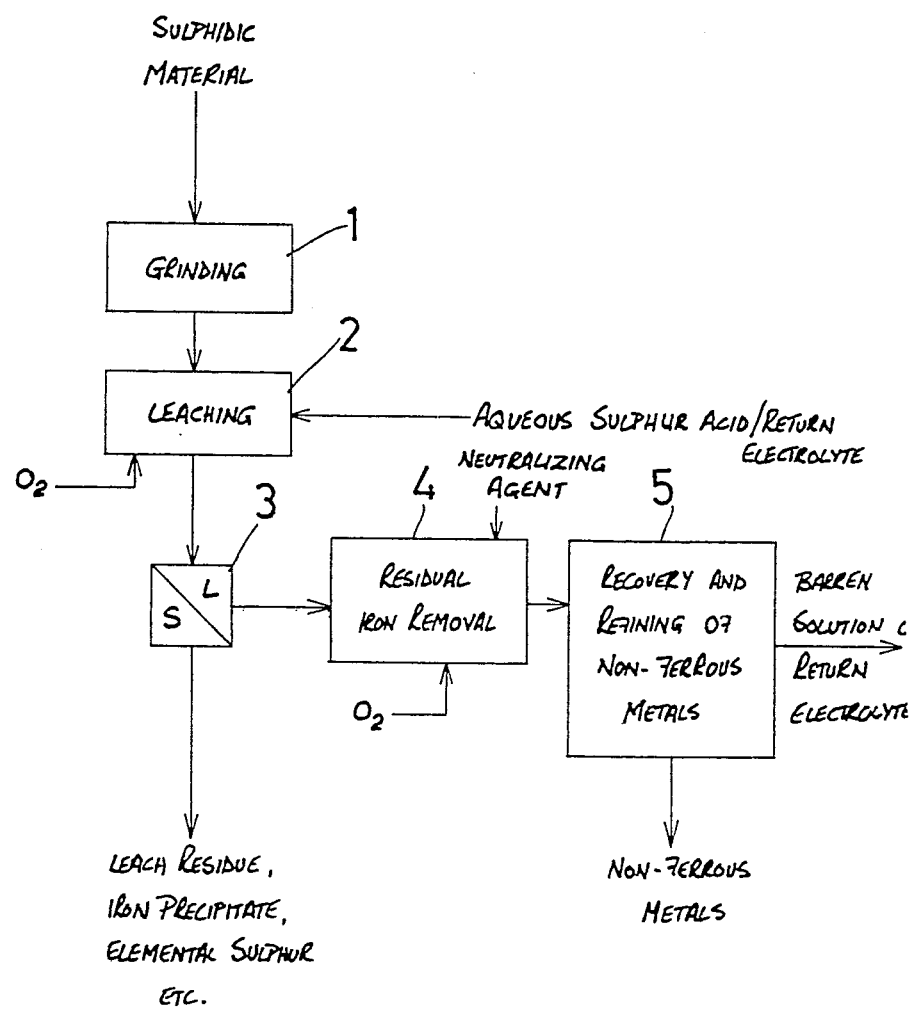

LEACHING OF SULPHIDIC MATTES CONTAINING NON-FERROUS METALS AND IRON

This is a continuation, of application Ser. No. 235,426, filed Feb. 17, 1981, now abandoned.

BACKGROUND OF THE INVENTION

This invention relates to the treatment of sulphidic mattes containing non-ferrous metals and iron in addition, in many instances, to insoluble materials such as platinum group metals, gold and silver.

BACKGROUND OF THE INVENTION

Numerous processes have been proposed for the treatment of sulphidic material containing nonferrous metals and, in many instances, iron, in addition to platinum group metals, gold and other metallic constituents. The treatment to which the material is subjected depends, at least to a large extent, on its nature and whether or not any particular metal compounds are acid soluble under the specific leaching conditions to which the material is subjected. The procedures also depend on the relative proportions of the various metal compounds which are present as well as on the metal values which are to be recovered therefrom.

There are many prior processes dealing with various aspects of recovery of metal values from sulphidic materials and some of these are disclosed in U.S. Pat. No. 4,024,218, U.S. Pat. No. 3,174,849, U.S. Pat. No. 3,642,435, U.S. Pat. No. 2,746,859, U.S. Pat. No. 395,190, Republic of South Africa Patent No. 79/5712, South African Pat. No. 71/4905 and British Pat. No. 760,624.

None of the aforementioned patented processes provide for the leaching of sulphidic mattes containing large percentages of iron together with non-ferrous metals substantially all of which are soluble in sulphuric acid or the like. Such materials also sometimes contain insoluble metal values such as platinum group metals, gold and silver.

The problem with the type of sulphidic matte under consideration is that the iron tends to dissolve at least as rapidly as the non-ferrous metals in view of its easily soluble form and thus with a non-oxidative sulphuric acid leach a large amount of acid would be consumed before all the soluble non-ferrous metals are dissolved. This is not only costly insofar as the consumption of acid is concerned but also leads to the problem that a large amount of iron must then be separated from the base metals which are typically cobalt, copper, nickel and zinc.

Alternatively, the leaching of such mattes is carried out under strongly oxidative conditions with the result that, whereas the iron may be rendered into an insoluble form such as goethite or haemetite, the sulphur in the matte is oxidized to sulphuric acid which is often surplus to subsequent process requirements and must be neutralised prior to subsequent treatment of the leach solutions for separation and recovery of the dissolved non-ferrous metals.

It is to be understood that the present invention is concerned solely with sulphidic mattes of a type comprising from 5% to 60% iron, 15% to 40% sulphur together with amounts of copper, cobalt, nickel and in some cases other base metals such as zinc as well as insoluble non-ferrous metals such as platinum group metals, gold and silver. The term insoluble non-ferrous metals includes those which actually dissolve but immediately precipitate out due to low solubility. Lead would be such a non-ferrous metal. Such sulphidic mattes can be produced by different processes but those of particular interest are sulphidic mattes produced from a slag cleaning operation involving the addition of sulphidisers (e.g. pyrite or similar material) and reducing agents (e.g. coal or coke) to a slag in order to recover metal values therefrom which would otherwise be lost. The other origin of materials falling within the general scope indicated above are those produced as a result of smelting a flotation concentrate in a reverbatory furnace, flash furnace, electric furnace or the like but wherein a substantial portion of the iron has not been removed by a subsequent converting operation.

It is the object of this invention to provide a process for the treatment of such sulphidic mattes (as herein defined) which will enable a basic separation step to be performed simultaneously with the leaching of non-ferrous metals therefrom and wherein iron is separated from the soluble non-ferrous metals at least to a large extent whilst the consumption of acid is limited and the surplus sulphur remains mostly in elemental form in the leach residue.

BRIEF DESCRIPTION OF THE DRAWINGS

The attached FIGURE is a flow diagram of a proposed metal processing plant, steps 1-5 which will be described in detail below.

DETAILED DESCRIPTION OF THE INVENTION

In accordance with this invention there is provided a method of treating sulphidic mattes having between 5% and 60% iron, between 15% and 40% sulphur together with non-ferrous metals comprising the contacting of the finely ground sulphidic matte with a leach solution having at least the stoichiometric quantity of available sulphate present therein which is required for dissolving all soluble non-ferrous metals in the matte, the leaching being carried out at a temperature of between 70° to 120° C. and with an oxygen partial pressure of from 50 kPa to 1000 kPa, the leaching being continued for a time sufficient to enable iron dissolved in the leach liquor to precipitate out and be displaced by soluble non-ferrous metals until such time as substantially all soluble non-ferrous metals are dissolved.

The preferred leaching conditions would be those that provide for the amount of sulphuric acid present in the leach solution to be chosen such that a concentration of sulphuric acid of between 2½ and 15 grams per liter remains when substantially all the soluble non-ferrous metals have been dissolved in which case approximately between 1 and 5 grams per liter of dissolved iron may be present in the leach solution; for the partial pressure of oxygen to be between 200 and 500 kPa; and for the temperature at which the leaching is effected to be between 90° and 100° C.

It will be understood that in the above described process substantially all the soluble non-ferrous metals (namely copper, cobalt, nickel and zinc in particular) are dissolved simultaneously with iron which precipitates to be replaced by further non-ferrous metals until such time as they are substantially completely dissolved. The conditions of the leaching are preferably chosen or adjusted such that an easily filterable iron precipitate is formed and, in particular, an iron precipitate of the type known as goethite. In this manner only a limited amount of acid is consumed and the surplus sulphur in the matte is substantially coverted to the elemental form. A simultaneous basic separation between the large amount of iron and sulphur present in the sulphidic matte and the soluble non-ferrous metals is achieved. Any insoluble non-ferrous metals which were present in the original sulphidic matte will remain as a residue together with the elemental sulphur and iron precipitate at the end of the leach stage.

After the completion of the leaching cycle the liquids and solids can be separated by any suitable means and the liquid subjected to oxidation and neutralization using a suitable alkali such as lime, limestone, sodium hydroxide or calcium carbonate to effect removal of the small amount of residual iron and thereby leave substantially only non-ferrous metals in the leaching liquor. This leach liquor can then be treated by any suitable processes to separate and recover the individual non-ferrous metals. It is to be noted that the process of this invention in particular is useful for recovering cobalt from certain types of slags where it may otherwise have been lost. Simultaneously copper and nickel are recovered. Thus the process is particularly attractive for the treatment of sulphidic mattes wherein sulphidic nickel, sulphidic copper and sulphidic cobalt are present in appreciable proportions in addition to the iron.

EXAMPLES OF THE INVENTION

A further feature of the invention is that the insoluble residue containing the insoluble metals, iron precipitate and sulphur may be further treated using known technology to recover the insoluble metals in a more concentrated form than in the original matte, and the elemental sulphur in a form that is either directly saleable or capable of being stockpiled in an innocuous form.

In order to implement the invention the material is ground to a suitable size and then contacted, at a suitable pulp density, with the leach solution in the presence of oxygen. Initially the iron present in the sulphidic material will leach together with non-ferrous metals and, when the acid content of the leach liquor has thereby decreased sufficiently, a selected condition will arise such that the precipitation of iron from solution in an easily separable form such as goethite will take place. The sulphate present as sulphuric acid, and that liberated from the iron when it precipitates, will continue to leach the non-ferrous material until such time as substantially all the sulphate has been consumed by non-ferrous materials when the leaching ceases. If excesses of available sulphate are initially present the result will be that a corresponding increased quantity of iron and/or acid will be present in the leaching liquor at the end of the leaching process. Where platinum group metals (e.g. platinum, palladium, ruthenium, rhodium, osmium and iridium), gold or silver are present these will generally not leach and will remain in the residue and can be recovered therefrom by any suitable technique.

In order to describe the invention more effectively, some background theory (as far as Applicant understands it at present) underlying the invention will now be discussed.

When a sulphide matte, containing soluble iron and soluble non-ferrous metals is dissolved in aqueous sulphuric acid alone, non-oxidative dissolution can take place as follows;

$$MS + H_2SO_4 \rightleftharpoons MSO_4 + H_2S \quad (1)$$

where M = iron, nickel, copper, cobalt, etc.

If the aqueous acidic leach solution used contains dissolved ferric ions in solution, these can also result in oxidative dissolution of the material (in addition to the non-oxidative dissolution according to reaction (1)) which produces elemental sulphur as follows:

$$MS + Fe_2(SO_4)_3 \rightarrow MSO_4 + 2FeSO_4 + S° \quad (2)$$

where M is as defined above.

The ferric irons will also oxidize any $H_2S$ produced non-oxidatively by equation (1) to form elemental sulphur as follows:

$$H_{12}S + Fe_2(SO_4)_3 \rightarrow 2FeSO_4 + H_2SO_4 + S° \quad (3)$$

If dissolved elemental oxygen is also present then the ferrous ions produced in the reactions of equations (1), (2), or (3) will be oxidized to their ferric state as follows:

$$2FeSO_4 + \tfrac{1}{2}O_2 + H_2SO_4 \rightarrow Fe_2(SO_4)_3 + H_2O \quad (4)$$

The reactions of equations (1) to (4) can be made to take place simultaneously and acid is consumed with the result that the sulphuric acid concentration decreases. When the acid concentration decreases to a sufficiently low value, hydrolysis and precipitation of the ferric species may occur to produce various types of iron precipitates. For example, conditions can be selected so that a predominantly goethite type precipitate is formed, as follows:

$$Fe_2(SO_4)_3 + 4H_2O \rightleftharpoons 2FeOOH + 3H_2SO_4 \quad (5)$$

If the total molar amount of available sulphate initially present in the leach solution is at least equal to the total molar amount of non-ferrous metals that are to be dissolved, then the reactions of equations (1) to (5) can be allowed to proceed simultaneously until substantially all the soluble non-ferrous metals have been dissolved, and the final dissolved iron concentration in the leach solution has been reduced to a relatively low value. The sulphidic iron that dissolved during the leach can thus substantially all be converted to a goethite-type precipitate.

One hypothetical application of the invention will now be described, by way of example, with reference to the accompanying drawing which is a flow diagram of a proposed metal processing plant.

The starting sulphidic material may assume any form but will, as will be apparent to those skilled in the art, generally be either a sulphidic mineral concentrated by flotation or other suitable process and smelted, or alternatively a pyrometallurgically produced matte as mentioned above. The sulphidic material is, only if required, ground at step 1 to provide a required particle size of material to be leached.

The ground material is contacted with aqueous sulphuric acid containing for example, 50 gram per liter sulphuric acid in a leaching step, step 2, which is preferably carried out at elevated temperature, say 90° C. and with an elevated oxygen partial pressure. The oxygen partial pressure can be selected according to kinetic considerations and it has, in general, been found that about 500 kPa results in good leaching. The choice of the temperature of about 90° C. ensures that elemental sulphur which is freed from the material remains in the solid form and thus prevents molten sulphur from blinding the ground material. Also the use of such a relatively low temperature enables ordinary rubber lined reaction vessels to be utilized thereby avoiding the high capital cost of expensive alternative materials which may be required for appreciably higher temperatures.

The leaching process is, as indicated above, continued until such time as substantially all of the soluble non-ferrous metals have been dissolved and most of the dissolved iron has been precipitated. It will be clear, of course, that the available sulphate in the initial leach solution is substantially equal to or slightly in excess of, the stoichiometric amount required for dissolution of the soluble non-ferrous metals in the initial sulphidic material. This is an important feature of the invention.

It should be pointed out that if the reaction of equation (1) proceeds faster than that of equation (3), the concentration of $H_2S$ in the reactor may increase to the point where an explosive mixture of $H_2S$ and oxygen exists and an explosion may result. This potential problem will most likely occur if the leaching process is effected batch-wise rather than in a continuous fashion. The problem can be overcome when leaching is effected batch-wise by (i) spiking the initial acid solution with iron (e.g. by re-dissolving some of the iron precipitate produced during the process, in the incoming leach solution) to ensure that the reactions of equations (4) and (3) proceed faster than reaction (1), and/or (ii) by adding the sulphidic material to the acidic solution slowly in a controlled manner again so that the reactions of equations (4) and (3) can be allowed to proceed faster than reaction (1).

In a continuous leaching system, both the sulphidic material and the acid leaching solution will be independently added at controlled rates to a relatively large volume of leaching solution which already contains sufficient dissolved iron so that the reactions of equations (4) and (3) can be made to proceed faster than that of equation (1) and explosive mixtures of $H_2S$ and $O_2$ will be avoided.

An important feature of the present invention is the fact that the dissolved iron precipitates out of solution during the course of leaching. It is important that the iron precipitates be of such a nature that it can be separated from the leach solution (e.g., by flocculation followed by settling or filtration) and that it can then be washed by a suitable method to reduce dissolved metal value losses to acceptable levels. It has been found that inter-alia the following variables can influence the physical nature of the precipitate:

Rate of precipitation, temperature, ferric ion concentration, total sulphate ion concentration, and the shear conditions induced by the mode of mechanical mixing utilized.

These variables can be selected and controlled in such a way that an iron precipitate with good dewatering and washing characteristics can be produced.

The pulp density can be selected as required for the leaching process and in general will depend on the initial sulphuric acid concentration of the leach solution, and on the amount of solids which have to be contacted with the acid to give the desired non-ferrous metal ion concentration in solution. In general, a 10% to 20% ratio of solids to liquid has been found satisfactory.

The final leach pulp from step 2 is dewatered and washed in step 3 using a suitable procedure. One procedure which has been found to be satisfactory is as follows: The leach pulp is flocculated (Magnafloc 351 marketed by Allied Colloids S.A. (Pty) Limited in the Republic of South Africa has been found to be suitable) and the flocculated solids are permitted to settle and thicken, the thickened sludge (after separation from the supernatant liquor) is then filtered. Wash solution which is slightly acidic to prevent precipitation of base metals, is then applied to the surface of the filter cake to displace the residual leach liquor in the cake and wash the cake.

The filter cake from step 3 can then be further treated by methods known to those skilled in the art, to recover constituents of value which may be present therein.

For example, the filter cake may contain values which did not dissolve in step 2, such as the platinum group metals, or even a portion of the base metals such as nickel, copper, and cobalt. The elemental sulphur that formed in step 2 can also be recovered if so desired using methods known to those skilled in the art.

The filtrate from step 3 will generally contain some residual dissolved iron and some sulphuric acid. The acid will generally have to be partially neutralized and the iron removed in step 4, before methods can be applied to recover the nickel, copper, and cobalt from the solution. The neutralization can be carried out by use of a suitable neutralizing agent (e.g., sodium hydroxide, sodium carbonate, limestone or lime). If the pH value of the solution is high enough the ferric ions will precipitate out of solution. The ferrous ions present can be oxidized to their ferric state using air or oxygen so that they too can be precipitated out of solution. The iron and other precipitates will have to be dewatered and washed, and the iron-free solution will then proceed to step 5 for the removal and/or recovery and/or refining of the base metals such as nickel, copper, cobalt, zinc, etc. by methods known to those skilled in the art (e.g., solvent extraction, ion exchange, electrowinning, or selective precipitation).

The iron precipitate produced in step 4 could possibly be redissolved in the acid entering step 2, in order to ensure the initial presence of dissolved iron in step 2 and so suppress the possibility of an explosion by $H_2S$ and $O_2$ as described previously.

It must be pointed out that it may be possible to effect the neutralization and iron removal described for step 4, in step 2 after the completion of the leach, or in another step between steps 2 and 3. Doing this will enable the iron and other precipitates so produced to be dewatered and washed in step 3 along with the bulk of the solids present in the solution at the end of the leaching process.

Tests conducted this far, and extractions that have taken place, will now be described in order to exemplify the operation of the invention.

EXAMPLE 1

In this example a low-grade sulphide matte assaying as follows, was used:

Nickel 15,9 percent, copper 14,0 percent, cobalt 1,34 percent, iron 41,9 percent, and sulphidic sulphur 23,4 percent. The matte was crushed and ground until approximately 38,3 percent passed through a 75 $\mu m$ screen. 350 g of this material was added to a pressure reactor containing 5 liters of aqueous leach solution which contained 40 g/l of sulphuric acid. The leach was permitted to proceed for 5 hours with mixing at 90° C. and an oxygen overpressure of about 500 kPa.

The extractions of nickel, copper and cobalt from the matte based on the final residue assays were 96 percent, 93,6 percent and about 99 percent respectively. Table 1 indicates the changes in the composition of the leach liquor during leaching.

TABLE 1

| Time min | Nickel g/l | Copper g/l | Cobalt g/l | Total iron g/l | H$_2$SO$_4$ g/l |
|---|---|---|---|---|---|
| 0 | 0 | 0 | 0 | 0 | 40,0 |
| 15 | 4,9 | 1,6 | 0,50 | 7,1 | 13,2 |
| 30 | 5,5 | 4,4 | 0,55 | 8,5 | 5,8 |
| 60 | 7,0 | 5,7 | 0,66 | 6,9 | 3,2 |
| 20 | 8,7 | 7,2 | 0,77 | 4,1 | 4,0 |
| 180 | 9,7 | 8,2 | 0,83 | 2,9 | 5,2 |
| 240 | 10,3 | 8,5 | 0,87 | 2,0 | 5,8 |
| 300 | 10,8 | 8,7 | 0,91 | 1,1 | 6,8 |

EXAMPLE 2

350 g of the low-grade matte similar to that described in example 1 was leached under similar conditions to those in example 1 except in that the leach solution initially contained 50 g/l sulphuric acid instead of 40 g/l sulphuric acid as in example 1. After 5 hours of leaching the extractions of nickel, copper, and cobalt from the matte based on the final residue arrays were 99,7, 97,4, and 99,5 percent respectively. The final leach solution composition was nickel 11,3 g/l, copper 9,25 g/l, cobalt 0,93 g/l, Fe$^{2+}$ 0,8 g/l, Fe$^{3+}$ 2,8 g/l, and H$_2$SO$_4$ 9,4 g/l.

Clearly the result of the higher initial sulphuric acid concentration was not only to increase the extractions of the nickel, copper and cobalt from the matte, but also to raise the concentration of dissolved iron and acid in the final leach liquor.

EXAMPLE 3

In this example 350 g of the low-grade matte described in example 1 which had been ground until about 90 percent passed through a 75 μm screen was leached for 6 hours in 5 liters of aqueous leach solution which contained 40 g/l of sulphuric acid at a temperature of 90° C. and with an oxygen overpressure of about 500 kPa. The final leach residue weighed 269,9 g and assayed as follows: Ni—0,28%; Cu—1,1%; Co—0,03%; Fe—39,9%; elemental sulphur—19,1% and sulphide sulphur—2,9%. The extractions of nickel, copper and cobalt from the matte based on the final residue assays were 98,6 percent, 93,9 percent and 98,3 percent respectively. Table 2 indicates changes in the composition of the leach liquor during leaching.

TABLE 2

| Time min | Ni g/l | Cu g/l | Co g/l | Total Fe g/l | Fe$^{3+}$ g/l | H$_2$SO$_4$ g/l |
|---|---|---|---|---|---|---|
| 0 | 0 | 0 | 0 | 0 | 0 | 40,0 |
| 20 | 5,9 | 4,3 | 0,61 | 10,7 | 1,7 | 4,4 |
| 30 | 6,4 | 5,1 | 0,63 | 10,2 | — | 1,6 |
| 60 | 8,1 | 6,5 | 0,73 | 7,1 | 1,9 | 3,4 |
| 120 | 9,6 | 7,9 | 0,82 | 4,6 | 1,4 | 4,8 |
| 185 | 10,4 | 8,7 | 0,87 | 3,4 | 1,2 | 5,2 |
| 240 | 11,0 | 8,9 | 0,91 | 2,8 | 1,2 | 6,0 |
| 300 | 11,2 | 8,6 | 0,13 | 2,1 | 0,9 | 6,4 |
| 360 | 11,7 | 9,0 | 0,98 | 1,9 | 0,9 | 6,8 |

EXAMPLE 4

In this example a low grade sulphide matte assaying as follows, was used:

Nickel 12,0 percent, copper 9,9 percent, cobalt 1,36 percent, iron 50,4 percent, and sulphide sulphur 24 percent. The matte was crushed and ground until approximately 76,7 passed through a 75 μm screen. 500 g of this material was added to a pressure reactor containing five liters of aqueous leach solution which contained 50 g/l of sulphuric acid. The leach was permitted to proceed for 6 hours at 90° C. and an oxygen overpressure of about 500 kPa. The extractions of nickel, copper and cobalt from the matte, based on the final residue were 98,3 percent, 90,2 percent and 98,8 percent respectively. Table 3 indicates the change in the composition of the leach liquor during the course of leaching. Note particularly how the total iron dissolved in the solution increased to a maximum and then decreased to a fairly low value of 4,5 g/l after a total leaching time of 360 minutes. The final iron dissolved in solution represented less than ten percent of the iron present in the original low grade matte. Leaching for a longer period of time would most likely have increased the final extractions of nickel, copper and cobalt and have decreased the residual iron dissolved in the leach solution. This example further demonstrates how by leaching according to the methods described in the present invention the nickel, copper and cobalt can be selectively leached into solution in such a way that only a relatively small amount of the iron remains dissolved in the leach liquor at the end of the leaching period.

TABLE 3

| Time min | Nickel g/l | Copper g/l | Cobalt g/l | Total Iron g/l | Ferric Iron g/l | H$_2$SO$_4$ g/l |
|---|---|---|---|---|---|---|
| 0 | 0 | 0 | 0 | 0 | 0 | 50,0 |
| 60 | 4,78 | 0,29 | 0,69 | 21,7 | 0,7 | 2,4 |
| 120 | 5,7 | 2,81 | 0,81 | 15,8 | 3,2 | 5,2 |
| 180 | 8,8 | 5,5 | 1,09 | 10,3 | 4,3 | 5,2 |
| 240 | 10,6 | 7,3 | 1,22 | 7,5 | 3,5 | 6,8 |
| 300 | 11,7 | 8,6 | 1,31 | 5,8 | 3,0 | 7,0 |
| 360 | 11,7 | 8,5 | 1,30 | 4,5 | 2,7 | 7,6 |

To demonstrate how effectively the final solids which consist of unleached matte residue, iron precipitate and elemental sulphur produced in the above example, could be flocculated and settled, 1 liter of the final leach slurry at a temperature of about 25° C. was flocculated using 0,5 ml of a 0,5% solution of Magnafloc 351 flocculant which is marketed in South Africa by Allied Colloids (S.A.) (Pty) Limited. Table 4 gives the result of a settling test using the flocculated slurry performed in a 1 liter measuring cylinder. The time taken for the sludge to settle down to various volumes is recorded as well as the height of the sludge blanket at each of the time values.

TABLE 4

| Time sec. | Sludge height cm | Volume of sludge ml |
|---|---|---|
| 0 | 35,0 | 1000 |
| 11,8 | 31,5 | 900 |
| 22,4 | 28,0 | 800 |
| 34,7 | 24,5 | 700 |
| 47,7 | 21,0 | 600 |
| 61,7 | 17,5 | 500 |
| 164,8 | 10,5 | 300 |
| 516,0 | 7,0 | 200 |
| 900,0 | 6,3 | 180 |

To demonstrate how readily the final residue solids produced in the above example could be filtered, two filtration tests were performed. In the first filtration test the flocculated thickened slurry produced after decanting the clear supernatant liquor in the above settling test was filtered at a temperature of about 25° C. using a Buchner funnel. The Buchner funnel had a diameter of 11,5 cm and a Whatman 351 filter paper and a vacuum of 73,3 kPa were used. Filtration took less than 8 sec. and a filter cake weighing 143 g wet and 97,6 g dry with a thickness of about 11 mm was produced. Clearly the flocculated solids filtered extremely rapidly. In the second filtration test 600 ml of the final leach solution was filtered in the apparatus described above without prior flocculation or settling of the solids. Table 5 presents the results of the filtration test and indicates the time required for various amounts of clear filtrate to be collected in a measuring cylinder located below the Buchner funnel. The surface of the cake appeared to be dewatered after 105,2 sec. The final filter cake weighed 76 g wet and 51,2 g dry and had a cake thickness of about 6 mm. Clearly the final leach solids produced in this example demonstrates good filtration characteristics even without prior flocculation or thickening. In both the above filtration tests, wash solution poured onto the surface of the dewatered cake, passed readily through the cake.

TABLE 5

| Time sec. | Volume of Filtrate ml |
|---|---|
| 10,8 | 100 |
| 24,8 | 200 |
| 40,1 | 300 |
| 59,3 | 400 |
| 82,1 | 500 |
| 105,2 | 565 |

EXAMPLE 5

In this example a low-grade matte assaying nickel 21,1 percent, copper 21,9 percent, cobalt 1,42 percent, iron 31,9 percent and sulphidic sulphur 21,3 percent which had been crushed until approximately 38,3 percent passed through a 75 μm screen was used. 350 g of this matte was added to 5 liter of leach solution which initially contained 65 g/l sulphuric acid. The matte was permitted to leach for 5 hours at 100° C. with an oxygen overpressure of 750 kPa. The extraction of nickel, copper, and cobalt based on the final residue assays were 97,6, 98,5 and 99,1 percent respectively and the final leach liquor had a composition of nickel 14,8 g/l, copper 14,9 g/l, cobalt 0,99 g/l, $Fe^{2+}$ 0,8 g/l, $Fe^{3+}$ 3,7 g/l and $H_2SO_4$ 12 g/l.

EXAMPLE 6

In this example high and low grade flotation concentrates from the same flotation circuit were blended in the ratio 4 to 1 to simulate the composition of a bulk float concentrate. This concentrate assayed nickel 4,2 percent, copper 2,3 percent, cobalt 0,22 percent, iron 43,3 percent and sulphide sulphur about 34,2 percent. 1 kg of this concentrate was smelted with 8,9 g of lime at 1450° C. to give 760,2 g of matte assaying nickel 5,3 percent copper 3 percent, cobalt 0,28 percent, and iron 53,7 percent, and 117,1 g slag assaying nickel 0,4 percent, copper 0,2 percent, cobalt 0,03 percent and iron 4,96 percent. Thus a total weight loss during smelting of 131,6 g took place, which can most likely be attributed to the labile sulphur which was driven off. The smelted matte was crushed and ground very fine and 706,6 g of the ground matte was leached for 6 hours in 5 liter leach solution which contained 50 g/l sulphuric acid at a temperature of 90° C. and with an oxygen partial pressure of about 500 kPa. The extractions of nickel, copper, and cobalt based on the final leach residue assays were 94,2 percent, 96,2 percent and 90,8 percent respectively, and the final leach liquor had a composition as follows: nickel 8,56 g/l, copper 4,3 g/l, cobalt 0,4 g/l, total iron 10,6 g/l, and $H_2SO_4$ 7,2 g/l.

What I claim as new and desire to secure by Letters Patent is:

1. A method of treating sulphidic mattes containing between 5% and 60% iron, between 15% and 40% sulphur together with soluble non-ferrous metals or metal compounds selected from the group consisting of copper, cobalt, nickel and zinc, said method comprising contacting and leaching finely ground sulphidic matte with a leach solution having at least the stoichimetric quantity of available sulphate present therein which is required for dissolving all soluble non-ferrous metals in the matte as sulphates, the leaching being carried out at a temperature of between 70° to 120° C. and with an oxygen partial pressure from 50 kPa to 1,000 kPa, the leaching being continued for a time sufficient to enable iron, which initially dissolves in the leach liquor, to precipitate out as a filterable iron precipitate and be displaced by soluble non-ferrous metals until such time as substantially all soluble sulpur is liberated in the form of elemental sulphur.

2. A method as recited in claim 1 in which the amount of available sulphate present in the leaching solution is chosen to provide sulphate in the sulphuric acid form at a concentration of between 2.5 and 15 grams per liter after substantially all the soluble non-ferrous metals have been dissolved in which case between 1.0 and 5.0 grams per liter dissolved iron will be in solution and the filterable precipitate is predominantly goethite.

3. A method as claimed in claim 1 in which the oxygen partial pressure is between 200 and 500 kPa.

4. A method as claimed in claim 1 in which the temperature of the leach solution is from 90° C. to 100° C.

5. A method as claimed in claim 1 in which the sulphidic material contains, in addition to iron and sulphur appreciable quantities of copper, cobalt and nickel.

6. A method as claimed in claim 1 in which the sulphidic material contains platinum group metals, gold and silver which are insoluble and thus remain in the leach residue.

7. A method as claimed in claim 1 in which required insoluble metals or sulphur are separated and recovered from the leach residue.

8. A method as claimed in claim 1 wherein the residual iron in solution at the end of the leaching stage is removed by oxidation and neutralization.

9. A method as claimed in claim 1 wherein the dissolved non-ferrous metals are separated from each other and recovered.

10. A method of treating sulphidic mattes containing between 5% wt. to 60% wt. iron, 15% wt. to 40% wt. sulphur together with copper, cobalt, nickel and optionally other soluble non-ferrous metals or metal compounds including zinc, said method simultaneously separating iron and sulphur from the matte and extracting the soluble non-ferrous metals therefrom and comprising the steps of:

(1) contacting and leaching finely ground sulphidic matte with a sulphuric acid leach solution having at least the stoichometric quantity of available sulphate present therein required to dissolve all soluble non-ferrous metals present in the matte as sulphates, said leaching conducted at from 70° C. to 120° C. with an oxygen partial pressure from 50 kPa to 1,000 kPa; and
(2) continuing said leaching until (i) the iron, which initially dissolves in the leach liquor, is precipitated out as a filterable iron precipitate and is displaced by the soluble non-ferrous metals, and (ii) substantially all soluble sulphur is liberated in the form of elemental sulphur.

* * * * *